US008484970B2

(12) United States Patent  
Bielass

(10) Patent No.: US 8,484,970 B2  
(45) Date of Patent: Jul. 16, 2013

(54) RELIEF VALVE WITH DOUBLE VALVE ARRANGMENT FOR RELEASING A BOOSTER PRESSURE OF A TURBOCHARGER

(75) Inventor: Ekkehard Bielass, Dresden (DE)

(73) Assignee: A. Kayser Automotive Systems GmbH (DE)

( * ) Notice: Subject to any disclaimer, the term of this patent is extended or adjusted under 35 U.S.C. 154(b) by 777 days.

(21) Appl. No.: 12/378,062

(22) Filed: Feb. 10, 2009

(65) Prior Publication Data

US 2009/0205333 A1    Aug. 20, 2009

(30) Foreign Application Priority Data

Feb. 15, 2008  (DE) .......................... 10 2008 009 424  
Mar. 4, 2008   (DE) .......................... 10 2008 012 467

(51) Int. Cl.  
*F02B 33/44* (2006.01)  
*F02D 23/00* (2006.01)

(52) U.S. Cl.  
USPC .............................................. 60/611; 60/602

(58) Field of Classification Search  
CPC .................................. F02B 33/44; F02D 23/00  
USPC .............................. 60/611, 602; 251/50, 284  
See application file for complete search history.

(56) References Cited

U.S. PATENT DOCUMENTS

| | | | |
|---|---|---|---|
| 4,434,775 A * | 3/1984 | Yoshimura et al. | 60/611 |
| 4,512,153 A * | 4/1985 | Kawabata et al. | 60/611 |
| 4,682,759 A * | 7/1987 | Hall et al. | 251/210 |
| 2010/0206388 A1 | 8/2010 | Bielab | |

FOREIGN PATENT DOCUMENTS

DE   10 2008 009 424.2   2/2008  
DE   10 2008 012 467.2   3/2008

(Continued)

OTHER PUBLICATIONS

Machine translation of WO2006029814A1.*

*Primary Examiner* — Tran Nguyen  
*Assistant Examiner* — Michael Andrews  
(74) *Attorney, Agent, or Firm* — Gerald E. Hespos; Michael J. Porco; Matthew T. Hespos

(57) ABSTRACT

The invention relates to a relief valve comprising:
 a first valve body (3) for opening and closing a fluid passage (33) between a first valve connection (31) and a second valve connection (32); a second valve body (4), which is arranged on the first valve body (3), for opening and closing a valve gate (3A), which is arranged in the first valve body (3), between the first valve connection (31) and a valve interior (9); at least one fluid passage (11) providing a connection between the valve interior (9) and the second valve connection (32); a closure member (18) for selectively opening and closing the fluid passage (11); an actuator (2, 7) for moving or actuating the second valve body (4) in a closing direction, wherein a movable member (2) of the actuator (2, 7) is arranged so as to be movable, after the closing of the second valve body (4), further in the same direction, so that the first valve body (3) can be moved in an opening direction of the first valve body (3) via an engagement of the second valve body (4) with the valve seat (3C) which is arranged on the first valve body (3), wherein a stop element (13), which is operatively connected to the second valve body (4) and/or the movable member (2), can be brought into engagement with the first valve body (3) to move the first valve body (3) in a closing direction, and also to a method for opening and closing a relief valve.

20 Claims, 6 Drawing Sheets

FOREIGN PATENT DOCUMENTS

DE 10 2007 002 432 B3 6/2008
WO WO 2006029814 A1 * 3/2006

* cited by examiner

RELIEF VALVE WITH DOUBLE VALVE ARRANGMENT FOR RELEASING A BOOSTER PRESSURE OF A TURBOCHARGER

This application claims the priority benefit of pending German application No. 10 2008 009 424.2, filed Feb. 15, 2008, the disclosure of which is included in its entirety herein, and pending German application No. 10 2008 012 467.2, filed Mar. 4, 2008, the disclosure of which is included in its entirety herein.

The present invention relates to a relief valve, in particular to a relief valve for releasing a booster pressure of a turbocharger.

In order to meet increasingly stringent requirements placed on the exhaust gas emissions of motor vehicles and also on lowering fuel consumption, actuating members for engine open and closed-loop control systems, such as a relief valve of this type, must respond rapidly and precisely to a corresponding actuating signal from an engine control unit. However, this requirement is complicated by the fact that a spring for pressing a relief valve of this type closed must apply a high force to keep the valve closed counter to the back pressure applied by the turbocharger.

In order to overcome this drawback, German laid-open patent specification DE 102 48 125 A1 proposes what is known as a balanced valve in which fluid passages are arranged in a valve body to act also on the back of the valve body with the fluid pressure applied. The back of the valve body is sealed via a diaphragm. As the same compressive force is thus applied on each side of the valve body, a weaker spring and a weaker actuator can be built in.

Patent specification DE 10 2004 044 439 B4 proposes a relief valve for a turbocharger comprising a lip-shaped sealing element to seal a back of the valve body when the valve body is closed, so that a fluid force acting on the back of the valve body keeps the valve body closed, while the fluid pressure acting on the back is released, as the valve opens, via a radial annular gap of the sealing element to open the valve body as a result of the back pressure applied to an end face of the valve body. In this case, the lip-shaped sealing element has a larger effective diameter than a sealing seat of the valve body, thus generating in the closing direction an excess force which is used to keep the valve closed.

The object of the invention consists in providing an improved relief valve which can open very rapidly and has a low overall size to serve preferably as an actuating member for the open or closed-loop control system of a turbocharger of an internal combustion engine.

This object is achieved by the features of the independent claims. Advantageous developments of the invention are defined in the dependent claims.

The invention provides a relief valve comprising:
a first valve body for opening and closing a fluid passage between a first valve connection and a second valve connection;
a second valve body, which is arranged on the first valve body, for opening and closing a valve gate, which is arranged in the first valve body, between the first valve connection and a valve interior;
at least one fluid passage providing a connection between the valve interior and the second valve connection;
a closure member for selectively opening and closing the fluid passage;
an actuator for moving or actuating the second valve body in a closing direction, wherein a movable member of the actuator is arranged so as to be movable, after the closing of the second valve body, further in the same direction, so that the first valve body can be moved in an opening direction of the first valve body via an engagement of the second valve body with the valve seat which is arranged on the first valve body, wherein a stop element, which is operatively connected to the second valve body and/or the movable member, can be brought into engagement with the first valve body to move the first valve body in a closing direction.

If, when the first valve body is closed, the second valve body clears the fluid passage into the valve interior, a fluid pressure acts on a back of the first valve body to apply a closing force to the first valve body. In order to open the first valve body, the actuator has merely to pull the second valve body closed, in order to separate the first valve connection from the valve interior, and open the closure member, in order to let out fluid from the valve interior into the second valve connection, so that the pressure in the valve interior is reduced. As a consequence, the first valve body is slid open or pressed open as a result of the relatively high pressure applied to the first valve connection. In other words, in order to open the relief valve, the actuator has merely to apply a force for closing the second valve body and also for opening the closure member. The force required for opening the valve body, on the other hand, is applied by the excess pressure applied to the first valve connection. When the valve is closed, on the other hand, the pressure applied to the first valve connection can infiltrate the valve interior via the second valve connection to keep the first valve body closed via the pressure acting on the back of the first valve body, when the fluid pressure is closed by the closure member, to prevent the fluid from flowing away out of the valve interior into the second valve connection.

Preferably, the relief valve has a pre-tensioning means, such as for example a spring, for moving the second valve body in an opening direction of the second valve body.

The spring can be arranged to speed up an opening process of the second valve body 4 in order to introduce the closing process of the first valve body at increased response speed.

Also preferably, the stop element, which is operatively connected to the second valve body and/or the movable member, can be brought into engagement with the first valve body by the pre-tensioning force of the pre-tensioning means to move the first valve body in a closing direction with the aid of the pre-tensioning means. Thus, in the closing process of the first valve body, the spring helps to close said first valve body more rapidly.

Preferably, the closure member is arranged in such a way that it can be pressed by the pressure applied in the valve interior against a mouth of the fluid passage to seal the fluid passage.

If the closure member is arranged, preferably by arranging in a corresponding recess or pocket of the stop element and/or of the first valve body, in such a way that it can be pressed by the pressure applied in the valve interior against a mouth of the fluid passage, a very simply configured closure member, which can be manufactured inexpensively, can be provided for the fluid passage.

According to a preferred embodiment, the closure member is displaceably arranged in order, during the opening of the first valve body, to be displaceable, by entering into engagement with the first stop element and/or the first valve body, in such a way that the mouth of the fluid passage is at least partly cleared.

If, furthermore, the closure member is displaceable, during the opening of the first valve body by corresponding entering-into-engagement with the stop element and/or the first valve body, the mouth of the fluid passage can be cleared by the opening movement of the first valve body to allow the fluid to issue from the valve interior into the second valve connection. In this way, a rapid reduction in pressure is generated in the valve interior in order rapidly to slide open the first valve body as a result of the fluid pressure which is applied from below to the first valve connection and thus to the first valve body.

Preferably, the stop element is embodied as a spring plate which has fluid passages on its circumference and is arranged between the movable member and the second valve body.

Also preferably, the force of the pre-tensioning means and of the actuator are designed in such a way that the first valve body opens only incompletely in the pressureless state as a result of the actuating force of the actuator and complete opening of the first valve body is caused by the fluid pressure prevailing in the first valve connection in that this fluid pressure acts against the end face of the first valve body and the fluid escapes from the valve interior via the opened fluid passage when the second valve body is closed, so that a difference in pressure is established between the end face and a back of the first valve body (FIG. 4).

In this way, a small actuator can be used to attain a minimum overall size of the relief valve and to provide low heat evolution of the actuator.

Preferably, the first valve body has on its circumference a sealing element to seal the valve interior relative to the second valve connection.

By arranging the sealing element on the valve body, leakage from the valve interior into the second valve connection can be minimized or be completely prevented. A sealing element of this type can be configured as a piston ring, a diaphragm or a lip seal. In the case of the embodiment as a lip seal, said lip seal can be configured in such a way that it seals the valve interior from the second valve connection only when the first valve body is substantially completely closed, whereas the lip seal rises from its sealing seat, when the first valve body is opened, to clear a certain predefined gate cross section.

Preferably, the sealing element is configured in such a way that it produces an at least almost complete seal by axially applying a sealing lip against a corresponding sealing seat when the first valve body is closed and, when the first valve body is opened, allows a predefined flow between the valve interior and the second valve connection via radial play of the sealing lip.

Also preferably, at least an outer circumferential portion of the sealing lip is movable in a resilient manner substantially in the direction of movement of the first valve body or is elastically and/or flexibly deformable, and a protective collar, which is in engagement with the first valve body, is preferably arranged radially outside the outer circumferential portion of the sealing lip.

Preferably, the protective collar has a piston skirt which can be inserted in a sliding manner into a cylinder.

According to a preferred embodiment, the relief valve is configured as a valve of the insertion type that is to be inserted into a housing and seals an interior of the housing by means of a flange with a seal, which serves as the second valve connection, wherein the valve seat is arranged in the housing.

Preferably, the first valve body is guided in the relief valve in such a way that an axis of the first valve body is pivotable through a predefined angle relative to an axis of the actuator to compensate for production and installation tolerances, thus ensuring uniform abutment of the seal of the first valve body against a valve seat of the housing.

Furthermore, a method is provided for opening a relief valve, in particular a relief valve such as was described hereinbefore, including the following steps:

pulling up or shifting a movable member, so that a second valve body closes a valve gate;

pulling the movable member up further, so that a first valve body is raised or shifted as a result of an engagement between the second valve body and the valve seat of the first valve body in order at least partly to open the fluid passage of the first valve body;

suction-extracting or discharging the fluid from a valve interior via a fluid passage when the closure member is opened;

sliding open the first valve body by means of the back pressure acting on an end face of the first valve body to open the relief valve.

Preferably, the method for opening a relief valve also has the step of displacing a closure member for opening the fluid passage by means of entering into engagement with a stop element and/or the first valve body.

A method is also provided for closing a relief valve, in particular a relief valve such as was described hereinbefore, including the following steps:

opening a second valve body, preferably by moving a stop element;

closing a fluid passage by means of a closure member;

introducing fluid into a valve interior via the opened second valve body to apply a compressive force to a first valve body in the closing direction;

pressing the first valve body closed, in particular with the aid of the fluid pressure in the valve interior counter to the back pressure acting on an end face, to close the relief valve.

The closing process of the relief valve is introduced by opening the second valve body. This opening process of the second valve body is carried out preferably by interrupting the supply of power to the actuator in order to take away the electromagnetic force for pulling up the actuator. As a result, the second valve body now rests loosely on its valve seat to allow a certain leakage into the valve interior. As a result, fluid can seep into the valve interior to build up pressure in the valve interior and as a result completely to open the second valve body in order to clear the full fluid passage of the second valve body.

The opening process of the second valve body can preferably be assisted by the gravity of said valve body or by a correspondingly arranged spring to speed up the opening process of the second valve body. Additionally or alternatively, the second valve body can however also be configured in such a way that said valve body allows a certain leakage even when closed in order to introduce fluid into the valve interior during the removal of the actuator force without an additional movement device for the second valve body. As, when the valve is completely opened, the closure member is opened to clear the mouth of the fluid passage, no pressure can build up in the valve interior even in the event of a certain leakage of the second valve body, because the fluid leaking through on the seat of the second valve body is immediately let out from the valve interior via the fluid passage.

Preferably, the closing method also includes the step of displacing the closure member for closing the fluid passage by means of entering into engagement with the stop element and/or the first valve body.

Also preferably, the method for closing a relief valve also has the step of applying a force of a pre-tensioning means to the first valve body in the closing direction.

Preferably, the relief valve described hereinbefore is used for releasing a booster pressure of a turbocharger.

Also provided is a turbocharger comprising a relief valve of this type for releasing a booster pressure.

Finally, there is provided an internal combustion engine comprising a turbocharger of this type and a relief valve of this type, wherein, in response to a throttle flap closing signal, the valve is opened to release the booster pressure into the intake tract upstream of the turbocharger.

A further advantage of the invention consists in the fact that the required force of an actuator is minimized, so that the relief valve itself generates little heat if the relief valve is actuated for example by a heat-generating, electromagnetic actuator.

The invention will now be described in greater detail based on preferred exemplary embodiments and with reference to the appended drawings, in which.

Figure 1:
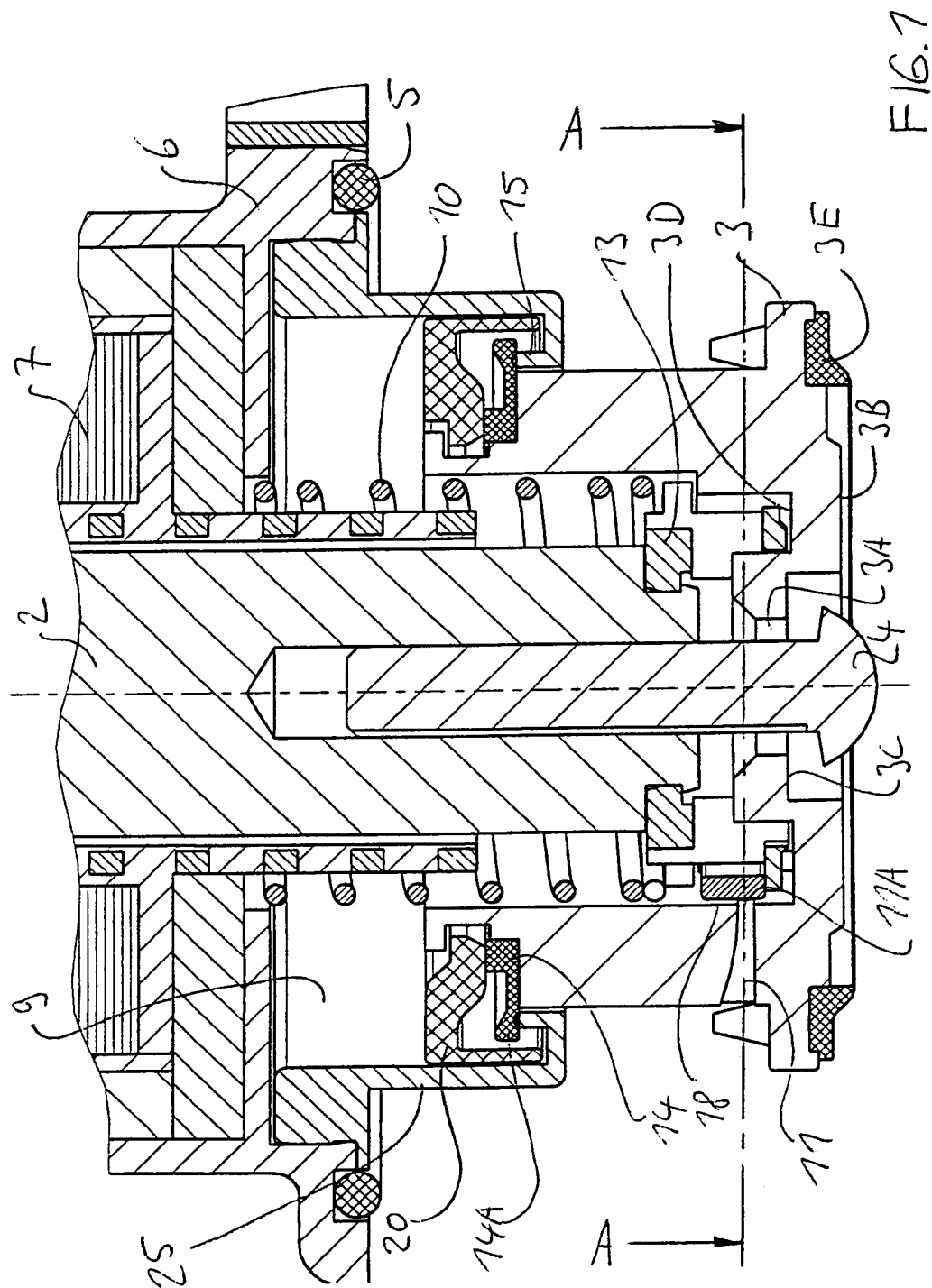
FIG. 1 is a section through the relief valve of the insertion type that can be inserted into a housing such as for example a turbocharger housing.
Figure 2:
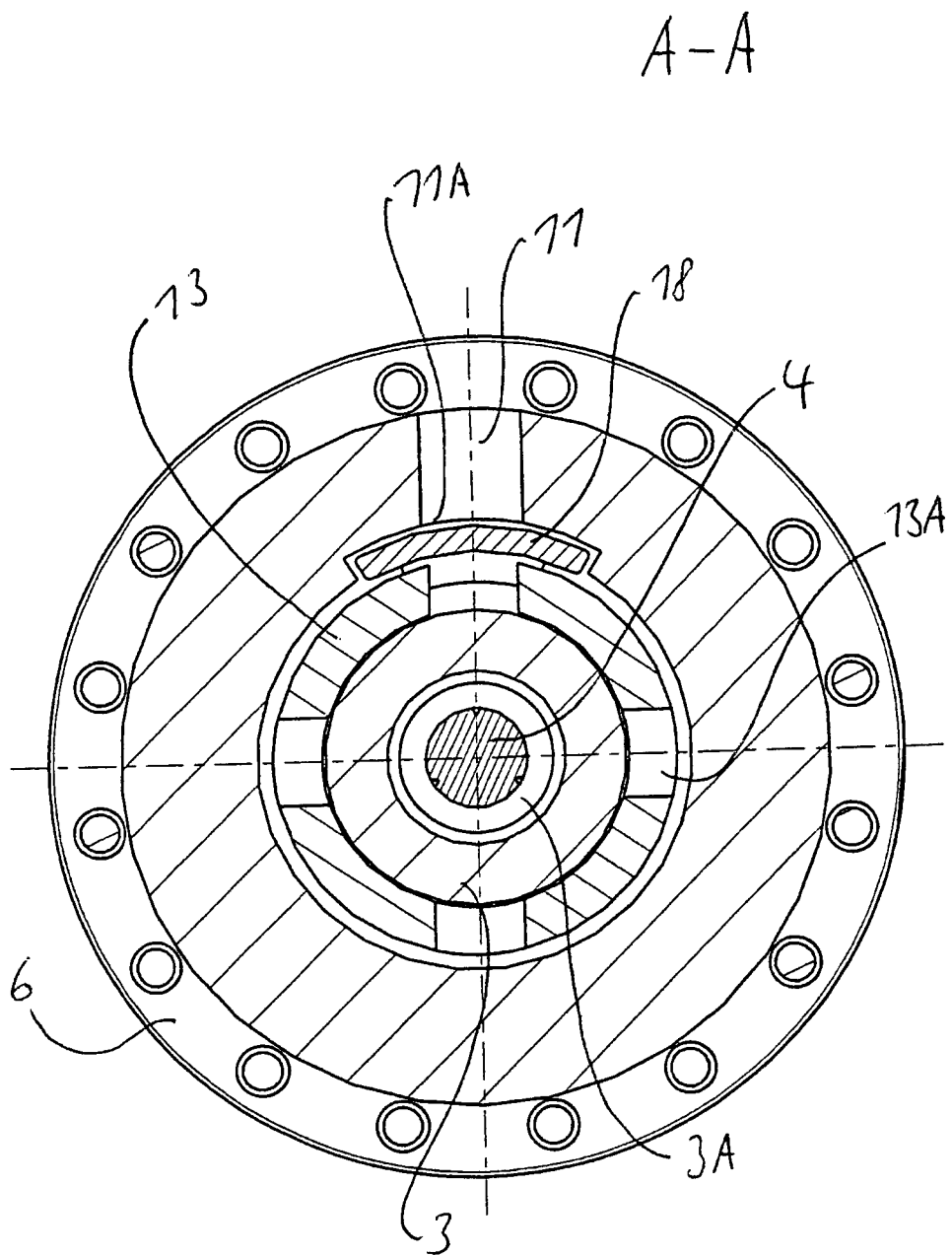
FIG. 2 is a section through the relief valve taken along the line A-A of FIG. 1.

The relief valve is embodied for example as a normally closed two-way two position valve and/or as a valve of the aforementioned insertion type such as is shown in FIGS. 3 to 6. A solenoid valve of this type has an electromagnetic coil 7 which is preferably substantially cylindrical in its embodiment and can be supplied with power via an electric terminal (not shown). A magnet armature 2, which is pulled upward in the view in the figures in response to a supply of power to the electric coil 7, is arranged within an axially extending opening in the cylindrical coil 7. The magnet armature 2 is preferably guided by means of a Teflon-coated bearing shell and made of a magnetic material, for example of iron.

Preferably, a spacer (not shown) is arranged at an upper stop position of the magnet armature 2 to prevent excessively strong adhering of the magnet armature 2 at its upper stop position, such as is disclosed in DE 10 2004 044 439 B4, the actuator of which, comprising the magnet armature 2 and coil 7, is included herein by way of reference. A second valve body 4 and also a stop element 13, preferably in the form of a spring plate, are arranged at a distal lower end of the magnet armature 2. The second valve body 4 is made of a suitable material such as for example metal (stainless steel) in order to have a long service life. The spring plate 13 is made of a suitable material such as for example a plastics material which withstands high temperatures. Glass fibre-reinforced polyamides and/or mineral-reinforced polyamides are for example suitable for this purpose.

The spring plate 13 and also the second valve body 4 are fixedly connected to the magnet armature 2 by a suitable connecting method such as plugging-in, adhesive bonding, riveting, etc., in order to move integrally with the magnet armature 2. Alternatively, the distal end of the magnet armature 2 can however also have what is known as a grooved drive stud (not shown) to fasten the spring plate 13 and the second valve body 4 to the distal end of the magnet armature 2. A grooved drive stud of this type is pressed into a hole in the magnet armature 2 to fasten the elements 13 and 4 to the magnet armature 2. Preferably, use is made of a grooved drive stud in accordance with DIN 1476 (ISO 8746) having a thickening at one end. However, use may also be made of another grooved drive stud, for example a grooved drive stud in accordance with DIN 1471 (ISO 8744), DIN 1472 (ISO 8745) or DIN 1473 (ISO 8740).

The spring plate 13 provides a form-fitting connection between a spring 10 and the magnet armature 2 to move the magnet armature 2, together with the spring plate 13 and the second valve body 4, downward as a result of the compressive force of the spring 10. The spring plate 13 has breaks or fluid passages 13A to allow the fluid to flow from the second valve body 4 to a valve interior 9.

In addition, the spring plate 13 acts as a stop element to apply, via an engagement of the spring plate 13 with a first valve body 3, a spring force to the first valve body 3, so that the first valve body 3 can be moved in the closing direction, i.e. downward as shown in the figures. The first valve body 3 has at its end face 3B a seal 3E in order to enter into engagement with a sealing seat 52 (see FIGS. 3 to 6), so that a fluid passage 33 between a first valve connection 31 and a second valve connection 32 is closed.

The valve seat 52 is preferably embodied in a turbocharger housing 50. The relief valve is configured as what is known as a valve of the insertion type that is inserted into the turbocharger housing 50 via a flange 6 which is sealed via a seal 5 on the turbocharger housing 50. In this case, a space arranged below the first valve body 3 serves as the first valve connection 31 which is connected to a pressure side of the turbocharger, whereas an annular space, formed on the outer circumference of the substantially cylindrical first valve body 3, within the turbocharger housing 50 serves as the second valve connection 32.

If a pressure P1 applied to the pressure side of the turbocharger is to be released, the first valve body 3 has to be opened to open the fluid passage 33 between the first valve connection 31 and the second valve connection 32. The valve can be used both on the compressor side for open or closed-loop controlling of the booster pressure and on the turbine side, in order to serve as what is known as a wastegate valve.

The valve interior 9 is configured as a pressure chamber which can exert a fluid pressure P3 on the back 3D of the first valve body 3 in order to exert a fluid compressive force in the closing direction of the first valve body 3. For this purpose, this valve interior 9 is sealed relative to the second valve connection 32, which is configured as an annular space, by means of a sealing element 14. This sealing can be carried out by a diaphragm or a piston ring.

Preferably, however, use is made of a lip-shaped sealing element 14 which rests, when the first valve body 3 is closed, against an axial sealing seat 15 of the valve housing to ensure almost complete sealing of the valve interior 9 relative to the second valve connection 32. When the first valve body 3 is opened, this lip-shaped sealing element 14 allows a slight, predefined flow between the valve interior 9 and the second valve connection 32 via radial play between the axial sealing seat 15 and an outer circumference of the first valve body 3. In order to limit or to throttle this flow, there is preferably arranged a protective collar 20 which has a piston skirt 20A and is inserted in a sliding manner into a cylinder 25 of a valve housing.

An effective diameter of the sealing of the sealing lip 14A is substantially the same size as an effective diameter of the seal 3E of the first valve body 3, so that substantially the same fluid pressure P1 acts on the end face 3B of the first valve body 3 as on the back 3D of the valve body 3. Depending on the design of the relief valve, the effective diameter of the sealing element 14 can however also be configured so as to be larger or smaller than the effective diameter of the seal 3E. In relation to the actuating force of the magnet armature 2 and also of the spring 10 having a selected spring rate and pre-tensioning, the designer can configure the diameters of the sealing element 14 and of the seal 3E accordingly, to attain a desired characteristic of the relief valve.

The spring 10 can optionally even be dispensed with altogether, if for example the diameter of the sealing element 14 is selected so as to be larger than the diameter of the seal 3E, to generate a corresponding closing force.

Furthermore, at least one fluid passage 11 is provided on an outer circumference of the first valve body to connect the valve interior 9 to the second valve connection 32. Fluid can be let out from the valve interior 9 into the second valve connection 32 through this fluid passage 11 if the pressure in the valve interior 9 is to be reduced for opening the valve.

This fluid passage 11 has preferably a large cross-sectional area to prevent blocking or clogging owing to depositions such as condensate, carbon, soot particles or the like. The fluid passage 11 is optimally configured in terms of flow in order to generate, for example in the passage 11, a laminar flow which does not cause the deposition of particles or drops of liquid.

In addition, the fluid passage 11 can be closed by a closure member 18 to build up in the valve interior 9, when the first valve body 3 is closed, a pressure acting on the first valve body 3 in the closing direction. The fluid passage 11 is formed preferably by casting the first valve body 3. This leads to the advantage of inexpensive, simple and rapid manufacture, because a subsequent machining process, such as drilling, milling, etc., can be dispensed with. In other words, the fluid passage 11 is formed with its large cross-sectional area already during casting, of the first valve body 3, and reworking is substantially not necessary.

The closure member 18 can be provided for example with a floating-mounted ring or tube piece or a ring segment or tube segment which is held loosely in a pocket or recess of the valve body 3. However, the closure member 18 used can also be a flap, a releasable check valve or a diaphragm valve.

The closure member 18 is configured preferably as a sheet or plate and floating-mounted before a mouth 11A of the fluid passage 11. In this case, the closure member 18 is held merely at a distance of a few tens of millimeters before the mouth 11A. As soon as an excess pressure of the valve interior 9 relative to the low-pressure side or of the second valve connection 32 is established, a small amount of fluid flows through the fluid passage 11. The reduced pressure, which is then produced transversely to the direction of flow, immediately draws the closure member 18, which weighs just a few milligrams, against the inner wall of the valve body 3 or before the mouth 11A and closes the slot 11. The pressure which now builds up in the interior 9 further ensures that the closure member 18 continues to adhere before the slot 11.

If an actuator 2 generates the opening force, the central pilot valve or the second valve body 4 is first closed in the compensated-for pressure range and, simultaneously with this movement, the closure member 18 is displaced in such a way that the mouth 11A of the slot 11 is cleared. That causes the rapid reduction in pressure in the valve interior 9 and as a consequence a very rapid opening movement of the first valve body 3.

The mode of operation for opening and closing the relief valve will now be described in greater detail with reference to the figures.

Figure 3:
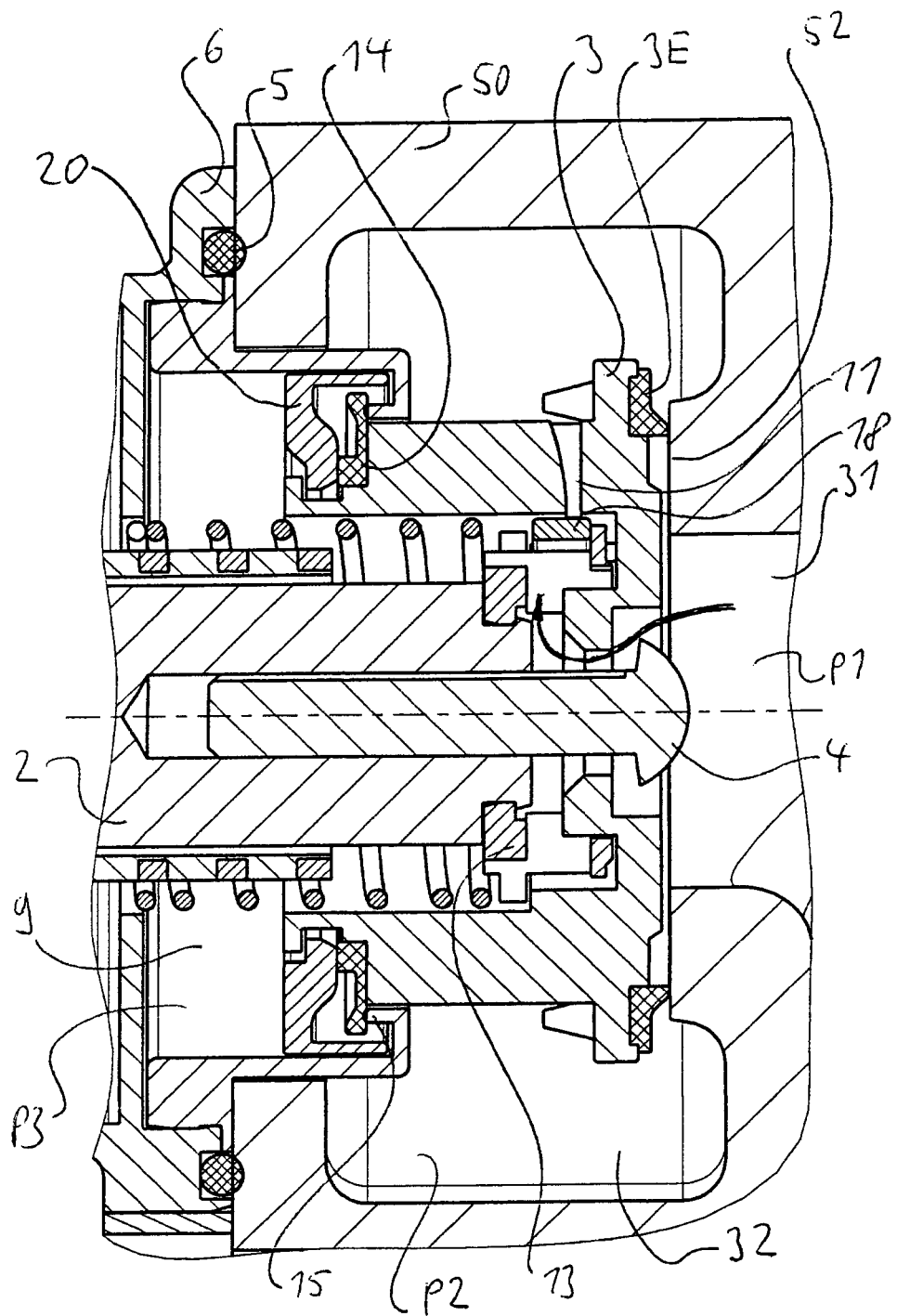
FIG. 3 is a section through the relief valve in the completely closed state, wherein the relief valve is integrated into a turbocharger housing.

In the closed state, illustrated in FIG. 3, of the relief valve, the seal 3E of the first valve body 3 rests against the sealing seat 52 of the housing 50, such as for example a turbocharger housing, in order to produce a seal between the first valve connection 31 and the second valve connection 32, so that no throughflow is possible between the two valve connections 31, 32. In this state, the second valve body 4 is opened and allows the excess pressure P1 applied to the first valve connection 31 to enter the valve interior 9 which is in turn sealed relative to the second valve connection 32 via the sealing element 14.

In this case, the closure member 18 rests against the mouth 11A of the fluid passage 11 in order substantially to seal the fluid passage 11. Preferably, the contour of the slot 11 or of the mouth 11A and the closure member 18 are made of hard material to allow low-friction and low-wear sliding of the closure member 18 for the purposes of opening and closing. In addition, the hard material can minimize or prevent soiling of the valve system by abraded material.

The resulting leakage owing to the hard material used for the slot 11 and the closure member 18 lies in this case in an admissible range of from, for example, 30 to 60 normal liters per hour. The use of hard materials, such as for example polyamide PA 6.6 or polyphenylene sulphide PPS for the second pilot valve 11A, 18, i.e. for the mouth 11A of the slot 11 and the closure member 18, offers the advantage that, during displacement of the closure member 18 relative to the mouth 11A, only low friction occurs and furthermore no or only minimal abraded material is produced, to avoid soiling of the valve system. Owing to the low friction, it is also possible to ensure a rapid switching process of the valve system and also a low actuator force in order to be able to use a small actuator 2, 7 or in order to minimize the heat generated by an electromagnet.

A drop in pressure in the valve interior 9 does not occur despite the leakage of the second pilot valve 11A, 18, because in the closed state of the first valve body 3, i.e. in the closed state of the valve system, the second valve body 4 is opened to allow an afterflow of fluid from the pressure side, i.e. from the first valve connection 31. In this way, the valve is held at all times in a secure manner in the closed state.

In this way, substantially the same fluid forces act on the end face 3B of the first valve body 3 and the back 3D of the first valve body 3 at the same pressure (P1=P3) if the effective diameter of the seal 3E is equal to that of the sealing element 14. Depending on the design of the valve, the diameter of the sealing element 14 can however also be configured so as to be somewhat larger or smaller than the diameter of the seal 3E. In this way, the designer can set desired force conditions in conjunction with the force of the actuator 2 and the force of the spring 10 (if said spring is present).

Figure 4:
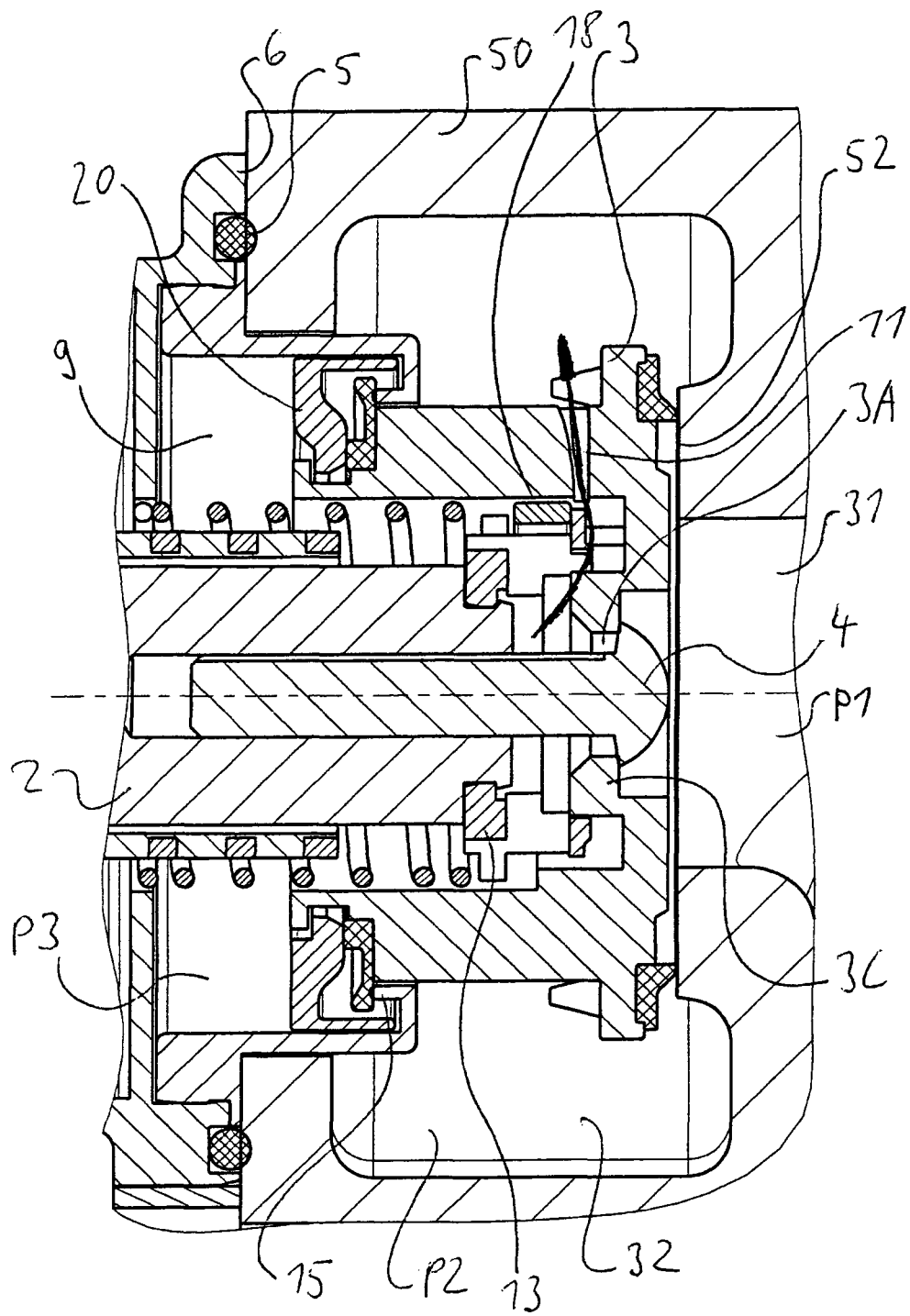
FIG. 4 shows the state with the first valve body still closed and the second valve body closed and also the fluid passage opened.

If the valve is to be opened, electric power is supplied to the coil 7 via the electric terminal (not shown) to excite the coil 7. As a result, the magnet armature 2 is pulled upward and entrains the second valve body 4 and also the spring plate 13. As a consequence, the second valve body 4 is brought into engagement with the valve seat 3C which is embodied within the valve body 3, as is shown in FIG. 4.

As a result of the engagement of the second valve body 4 with the valve seat 3C, the valve gate 3A between the first valve connection 31 and the valve interior 9 is closed.

Furthermore, as a result of entering-into-engagement of the stop element 13 and/or of the first valve body 3 with the closure member 18, the closure member 18 is pushed away, toward the top of the drawing, from the mouth 11A of the fluid passage 11 to clear the fluid passage 11. As a result, the fluid can flow away from the valve interior 9 via the fluid passage 11, as is shown in FIG. 4, into the second valve connection 32 to reduce the pressure in the valve interior 9 or to compensate for it with the pressure on the downstream side or in the second valve connection 32.

Figure 5:
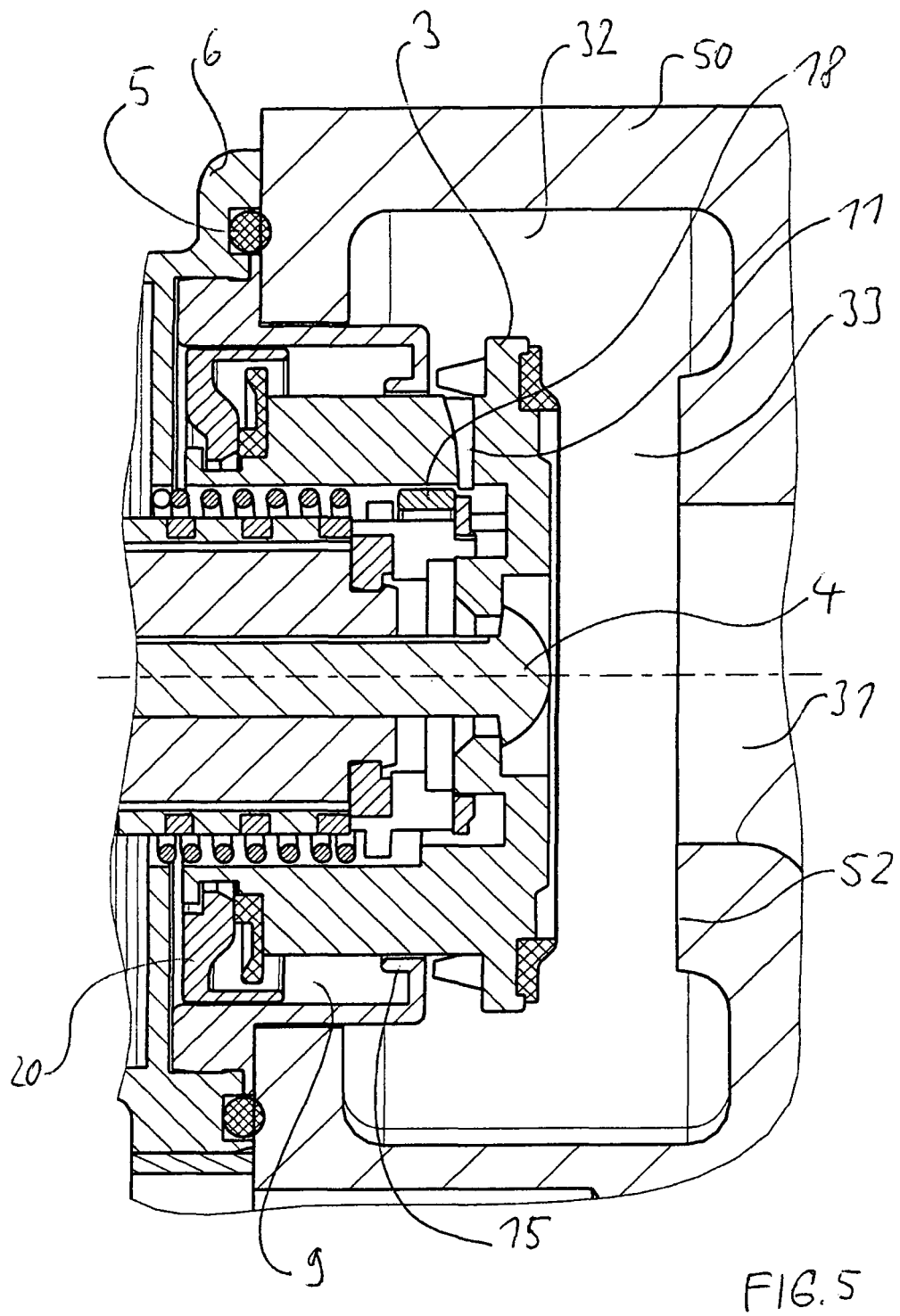
FIG. 5 shows the completely opened state of the relief valve.

As a consequence, a large difference in pressure is produced between the end face 3B and the back 3D of the first valve body 3 in order now to slide open, owing to this difference in pressure, the valve body 3 and to bring said valve body into the position shown in FIG. 5. In this case, the second valve body 4 is left in the closed position, preferably in the completely opened position, shown in FIG. 5, of the valve system. Alternatively, the second valve body 4 can however also be brought into a slight opened position when the first valve body 3 is completely opened. In this case, a part of the fluid would simply flow away to the second valve connection 32 through the passage of the second valve body 4 via the valve interior 9 and the fluid passage 11, without generating a significant reduction in pressure in the valve interior 9.

If, as a result of the further upward movement of the magnet armature 2 with the second valve body 4, the first valve body 3 is raised slightly from its seat 52, as is illustrated in FIG. 4, the fluid can flow away from the valve interior 9 via the opened fluid passage 11.

Owing to the reduction in the fluid pressure P3 in the valve interior 9, the valve body 3 is now moved upward, i.e. in an opening direction, owing to the excess pressure P1 acting on the first valve connection 31.

The completely opened state of the relief valve, i.e. of the valve body 3, is illustrated in FIG. 5. In this state, the second valve body 4 is substantially closed owing to the tensile force of the magnet armature 2.

If, starting from the completely opened state, illustrated in FIG. 5, of the relief valve, said relief valve is to be closed, this is carried out simply by interrupting the supply of power to the coil 7. As a result, the electromagnetic force acting on the magnet armature 2 is eliminated, so that a force required for sealing the second valve body 4 may be dispensed with in order to raise the second valve body 4 from the sealing seat 3C of the first valve body 3. In other words, the second valve body 4 opens the valve gate 3A, as is illustrated in particular in FIG. 6.

This produces a connection of the valve interior 9 to a back pressure side, i.e. the end face 3B of the first valve body 3, to introduce the back pressure or excess pressure P1 into the valve interior 9. This excess pressure P1 introduced into the valve interior 9 helps, together with the spring 10, to move the valve body 3 in a closing direction.

Figure 6:
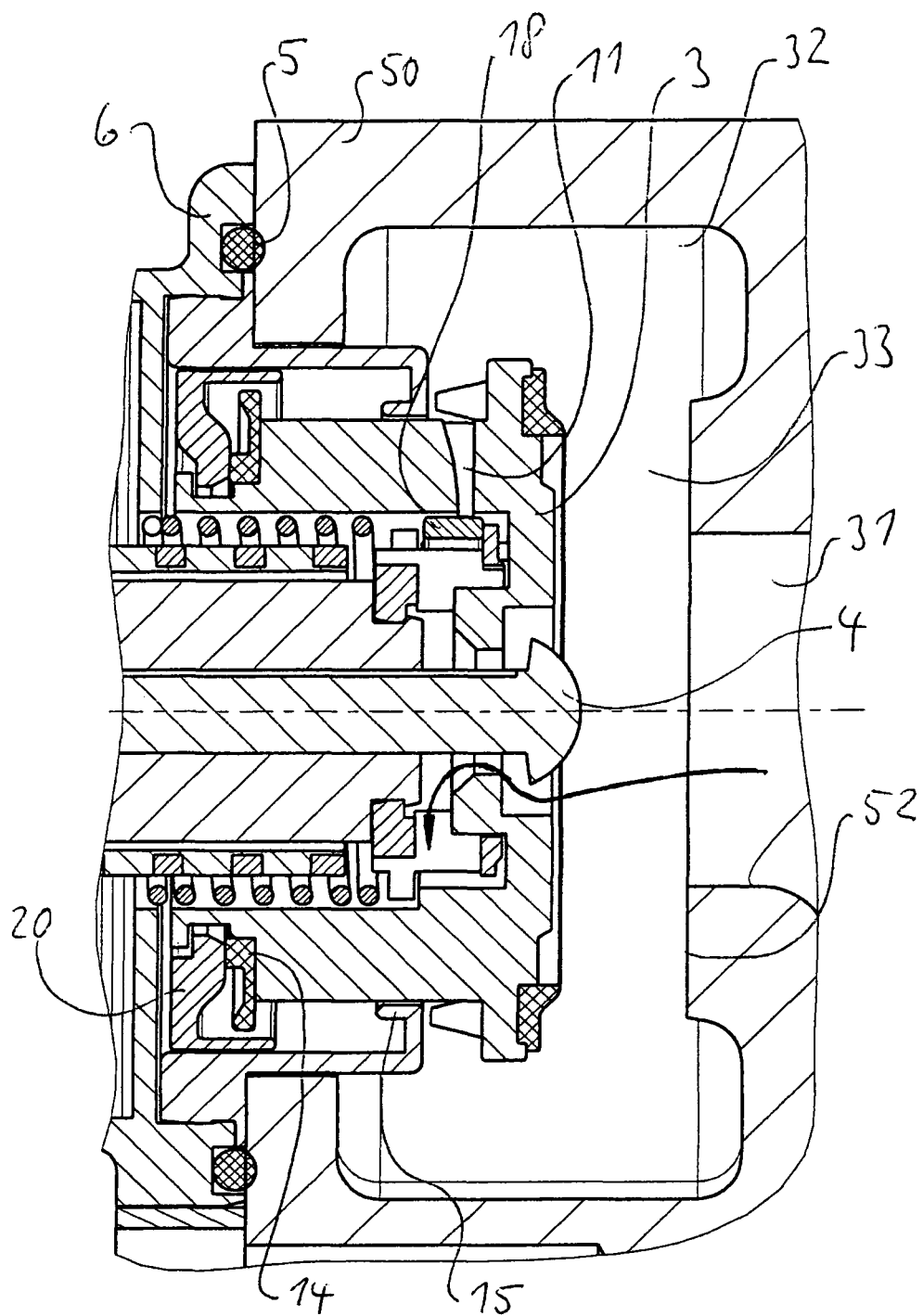
FIG. 6 shows the closing process of the relief valve.

If the opening force is taken away from the actuator 2, as is shown in FIG. 6, the second valve body 4 is opened preferably by the pre-tensioning means 10 to introduce fluid into the valve interior 9. The closure member 18 is slid by the stop element 13 downward before the mouth 11A. As a result of the pressure which is established in the valve interior 9, the closure member 18 is placed against the mouth 11A to close the fluid passage 11. In addition, the protective collar 24 or flow braking ring prevents the fluid from escaping rapidly from the valve interior 9, producing a throttling effect.

The pressure in the valve interior 9 together with the Bernoulli force which is produced in the fluid passage 33 and the force of the spring 10 press the first valve body 3 closed in order to close the relief valve.

Thus, the first valve body 3 is displaced downward, together with the stop element 13 and the magnet armature 2 to entrain the closure member 18, by entering into engagement, and pushing the closure member 18 before the mouth 11A of the fluid passage 11. The fluid which introduced into the valve interior 9 via the first pilot valve 3A, builds up a pressure in the valve interior and presses the closure member 18 against the mouth 11A of the fluid passage to seal said fluid passage.

Owing to the build-up of pressure in the valve interior 9, a pressure acting on an end face 3B and a back 3D of the first valve body 3 is substantially compensated for in order to close the first valve body 3, now owing to gravity or owing to a higher compressive force acting on the back thereof, if the diameter is configured so as to be correspondingly larger, or owing to a pre-tensioning means, such as for example a spring 10.

By accordingly adapting these flow resistances and also the flow resistance on the annular gap of the sealing element 14, a desired characteristic of the relief valve can be attained.

Thus, the first valve body 3 is kept closed, in the closed state shown in FIG. 3, by the fluid force acting on the back 3D, so that only a low spring force of the spring 10 is required to keep the relief valve closed. On the other hand, only a low force of the actuator 2, 7 is required in order, for opening the relief valve, to close the second small valve body 4, because the first valve body 3 is opened, after the release of the valve internal pressure P3, by the back pressure P1 applied to the end face 3B.

Thus, use may be made of a weak spring or no spring at all and/or of a small, comparatively weak actuator 2, 7 having a low power requirement and also low heat evolution. Nevertheless, the relief valve can be opened and closed in a very short time. In addition, fluttering of the first valve body 3 in the initial phase of the opening owing to the dynamic pressure drop in the fluid passage owing to the Venturi effect can be prevented by the rapid opening process owing to the release of the pressure from the valve interior 9.

The opening and closing forces occurring in the relief valve are preferably designed in such a way that the relief valve, i.e. the first valve body 3 of the relief valve, opens only slightly, for example by approx. 0.5 to 2 mm, in the pressureless state, at least at a low supply voltage of the magnet coil 7 and a high operating temperature, i.e. when a low current is flowing through the magnet coil 7, and is opened completely, for example by approx. 3 to 8 mm, only by the excess operating pressure P1 acting on the first valve connection 31. However, the opening of the relief valve is not to be restricted to this range; on the contrary, depending on the intended use and overall size of the valve, other ranges may also be selected.

The present invention is not limited to the exemplary embodiment described, but rather can be modified within the scope of protection of the claims. In particular, the actuator 2, 7 does not have to be an electromagnetic actuator; on the contrary, use may be made of any other actuator such as for example a pneumatic or hydraulic actuator or a servomotor. The relief valve does not necessarily have to be used in a turbocharger, but rather can also be applied elsewhere. In this case, the valve can be used not only for controlling gases but rather also for blocking off liquids. Nor does the valve have to be configured in what is known as the insertion type, but rather can have its own sub-housing comprising the corresponding valve seat 52.

An advantage of the new relief valve is the fact that the build-up of internal pressure, which is necessary for the closing, is promoted as a result of the fact that no fluid can flow out from the interior 9 owing to the closing of the fluid passage 11 by means of the closure member 18. On the other hand, as a result of the formation of the outlet opening as the slot 11, even in the event of low displacement of the closure member 18, i.e. at a small stroke of the pilot valve 4, a relatively large cross-sectional area is cleared in order, for opening the valve body 3, rapidly to reduce the pressure in the valve interior 9. In addition, owing to the relatively large cross-sectional area of the slot 11, the risk of soiling or clogging of the slot 11 can be minimized or prevented.

In the injection mould, the slot 11 does not present any problems, i.e. the slot 11 can be produced in a simple manner by casting, so that an additional machining process, such as drilling or milling, may be dispensed with. Thus, the slot or fluid passage 11 can be produced simply and inexpensively.

The inner shaping of the slot 11 can be optimally configured in terms of flow, so that little turbulence, which would promote the deposition of dirt entrained in the fluid, occurs as the fluid issues. This can further prevent soiling or clogging. In other words, a laminar flow is attained in the slot as a result of the shaping of the flow cross section to prevent deposition of solids and/or liquid drops on the wall of the slot. In this way, narrowing of the flow cross section or even complete closure of the slot can be reliably prevented.

The relief valve has the advantage of a rapid build-up of and reduction in pressure via the second pilot valve consisting of the slot 11 and closure member 18. As a result, the switching times, i.e. the duration for opening and closing the valve, are very short in order to be able to react in an open and closed-loop control circuit very rapidly in response to a corresponding signal. As a result of the clear switching-over between opening and closing, there is almost no pressure dependency and no pressure upper limit.

The contour of the slot 11 or the mouth 11A and the closure member 18 should be made preferably of hard material to allow low-friction and low-wear sliding of the closure member 18. As a result, displacement of the closure member 18 is possible with low forces. In addition, soiling of the valve system by abraded material is minimized or prevented.

The hard-on-hard sealing produces a leakage which can be measured as untightness of the closed valve system. However, this leakage lies within an admissible range of from, for example, 30 to 60 normal liters per hour. The use of hard materials, such as for example polyamide PA 6.6 or polyphenylene sulphide PPS for the second pilot valve 11A, 18, i.e. for the mouth 11A of the slot 11 and the closure member 18, offers the advantage that, during displacement of the closure member 18 relative to the mouth 11A, only low friction occurs and furthermore no or only minimal abraded material is produced, to avoid soiling of the valve system.

List of Reference Numerals
1 Valve housing
2 Magnet armature
3 First valve body
3A Valve gate
3B End face
3C Valve seat
3D Back
3E Seal
4 Second valve body
5 Seal
6 Flange
7 Magnet coil
9 Valve interior
10 Pre-tensioning means or spring
11 Fluid passage
11A Mouth
13 Stop element
13A Fluid passage
14 Sealing element
14A Sealing lip
15 Axial sealing seat
18 Closure member
20 Protective collar
20A Piston skirt
25 Cylinder
31 First valve connection
32 Second valve connection
33 Fluid passage
50 Turbocharger housing
52 Sealing seat
P1 Upstream pressure
P2 Downstream pressure
P3 Valve internal pressure

The invention claimed is:

1. Relief valve comprising:
a first valve body for opening and closing a fluid passage between a first valve connection and a second valve connection, a valve gate being formed through the first valve body and a valve seat formed on the first valve body in proximity to the valve gate;
a second valve body movably disposed with respect to the first valve body for opening and closing the valve gate in the first valve body for providing communication between the first valve connection and a valve interior when the second valve body is moved away from the valve seat for opening the valve gate;
a second fluid passage providing a connection between the valve interior and the second valve connection;
a closure member for selectively opening and closing the second fluid passage;
an actuator for actuating the second valve body in a closing direction, the actuator having a movable member that is movable in the closing direction after the closing of the second valve body so that the first valve body can be moved in an opening direction of the first valve body via an engagement of the second valve body with the valve seat on the first valve body; and
a stop element operatively connected to the second valve body and/or the movable member and being engageable with the first valve body to move the first valve body in a closing direction.

2. Relief valve according to claim 1, also comprising a pre-tensioning means for moving the second valve body in an opening direction of the second valve body.

3. Relief valve according to claim 2, wherein the stop element, which is operatively connected to the second valve body and/or the movable member is engageable with the first valve body by a pre-tensioning force of the pre-tensioning means to move the first valve body in a closing direction with aid of the pre-tensioning means.

4. Relief valve according to claim 2, wherein a force of the pre-tensioning means and of the actuator are designed in such a way that the first valve body opens only incompletely in a pressureless state as a result of an actuating force of the actuator and complete opening of the first valve body is caused by fluid pressure in the first valve connection and acting against an end face of the first valve body and the fluid escapes from the valve interior via the second fluid passage that is open when the second valve body is closed, so that a difference in pressure is established between the end face and a back of the first valve body that is opposite the end face.

5. Relief valve according to claim 4, wherein the first valve body has a sealing element on a circumference thereof to seal the valve interior relative to the second valve connection.

6. Relief valve according to claim 5, wherein the sealing element is configured to produce an at least almost complete sealed by axially applying a sealing lip against a corresponding sealing seat when the first valve body is closed and, when the first valve body is opened, allows a predefined flow between the valve interior and the second valve connection via radial play of the sealing lip.

7. Relief valve according to claim 6, wherein at least an outer circumferential portion of the sealing lip is movable in a resilient manner substantially in the direction of movement of the first valve body or is elastically and/or flexibly deformable, and a protective collar is arranged radially outside the outer circumferential portion of the sealing lip and is engaged with the first valve body.

8. Relief valve according to claim 7, wherein the protective collar has a piston skirt which can be inserted in a sliding manner into a cylinder.

9. Relief valve according to claim 1, wherein the closure member is arranged to be pressed by pressure applied in the valve interior against a mouth of the fluid passage to seal the fluid passage.

10. Relief valve according to claim 1, wherein the closure member is displaceable during the opening of the first valve body by entering into engagement with the stop element and/or the first valve body in such a way that the mouth of the fluid passage is at least partly cleared.

11. Relief valve according to claim 1, wherein the stop element is a spring plate arranged between the movable member and the second valve body, fluid passages formed through the spring plate at circumferentially spaced positions around the spring plate.

12. Relief valve according to claim 1, wherein the relief valve is configured to be inserted into a housing and has a flange with a seal that seals an interior of the housing, the housing defining at least a part of the second valve connection, wherein the valve seat is arranged in the housing with a further valve seat being arranged in the housing.

13. Relief valve according to claim 12, wherein the first valve body is guided in the relief valve in such a way that an axis of the first valve body is pivotable through a predefined angle relative to an axis of the actuator to compensate for production and installation tolerances, thus ensuring uniform abutment of the seal of the first valve body against a valve seat of the housing.

14. Turbocharger comprising a relief valve according to claim 1 for releasing a booster pressure.

15. Internal combustion engine comprising a turbocharger and a relief valve according to claim 1, wherein, in response to a throttle flap closing signal, the valve is opened to release the booster pressure into the intake tract upstream of the turbocharger.

16. Method for opening a relief valve that has a first valve body for opening and closing a fluid passage between a first valve connection and a second valve connection, a valve gate being formed through the first valve body, a valve seat formed on the first valve body in proximity to the valve gate, a second valve body movably disposed with respect to the first valve body for opening and closing the valve gate in the first valve body for providing communication between the first valve connection and a valve interior when the second valve body is moved away from the valve seat for opening the valve gate, a second fluid passage providing a connection between the valve interior and the second valve connection, a closure member for selectively opening and closing the second fluid passage, an actuator for actuating the second valve body in a closing direction, the actuator having a movable member that is movable in the closing direction after the closing of the second valve body so that the first valve body can be moved in an opening direction of the first valve body via an engagement of the second valve body with the valve seat on the first valve body, and a stop element operatively connected to the second valve body and/or the movable member and being engageable with the first valve body to move the first valve body in a closing direction, the method including the steps:
  pulling up or shifting the movable member, so that the second valve body closes the valve gate;
  pulling the movable member up further, so that the first valve body is raised or shifted as a result of the engagement between the second valve body and the valve seat of the first valve body in order at least partly to open the valve passage of the first valve body;
  suction-extracting or discharging the fluid from the valve interior via the fluid passage when the closure member is opened;
  sliding open the first valve body by means of the back pressure acting on the end face of the first valve body to open the relief valve.

17. Method for opening a relief valve according to claim 16 also including displacing the closure member for opening the fluid passage by means of entering into engagement with the stop element and/or the first valve body.

18. Method for opening a relief valve that has a first valve body for opening and closing a fluid passage between a first valve connection and a second valve connection, a valve gate being formed through the first valve body, a valve seat formed on the first valve body in proximity to the valve gate, a second valve body movably disposed with respect to the first valve body for opening and closing the valve gate in the first valve body for providing communication between the first valve connection and a valve interior when the second valve body is moved away from the valve seat for opening the valve gate, a second fluid passage providing a connection between the valve interior and the second valve connection, a closure member for selectively opening and closing the second fluid passage, an actuator for actuating the second valve body in a closing direction, the actuator having a movable member that is movable in the closing direction after the closing of the second valve body so that the first valve body can be moved in an opening direction of the first valve body via an engagement of the second valve body with the valve seat on the first valve body, and a stop element operatively connected to the second valve body and/or the movable member and being engageable with the first valve body to move the first valve body in a closing direction, the method including these steps:
  opening the second valve body by moving the stop element;
  closing the fluid passage by means of the closure member;
  introducing fluid into the valve interior via the opened second valve body to apply a compressive force to the first valve body in the closing direction;
  pressing the first valve body closed with the aid of fluid pressure in the valve interior counter to back pressure acting on the end face to close the relief valve.

19. Method for closing a relief valve according to claim 18, also including displacing the closure member for closing the fluid passage by means of entering into engagement with the stop element and/or the first valve body.

20. Method for closing a relief valve according to claim 19, also including applying a force up a pre-tensioning means to the first valve body in the closing direction.

* * * * *